US007430113B2

(12) United States Patent
McRight et al.

(10) Patent No.: US 7,430,113 B2
(45) Date of Patent: Sep. 30, 2008

(54) SYSTEM AND METHOD FOR DISPLAY STAND HEIGHT ADJUSTMENT

(75) Inventors: William Carder McRight, Round Rock, TX (US); Faisal Rasheed Awan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 11/179,275

(22) Filed: Jul. 12, 2005

(65) Prior Publication Data

US 2007/0013720 A1    Jan. 18, 2007

(51) Int. Cl.
*G06F 1/16* (2006.01)

(52) U.S. Cl. ............... 361/683; 361/681; 248/917; 248/919; 248/921; 248/922; 248/923

(58) Field of Classification Search ......... 248/917–924; 361/681–683
See application file for complete search history.

(56) References Cited

U.S. PATENT DOCUMENTS

| | | | |
|---|---|---|---|
| 5,842,672 A | 12/1998 | Sweere et al. | 248/278.1 |
| 6,068,227 A | 5/2000 | Morgan et al. | 248/278.1 |
| 6,275,376 B1 | 8/2001 | Moon | 361/683 |
| 6,286,794 B1 | 9/2001 | Harbin | 248/123.2 |
| 7,061,754 B2 * | 6/2006 | Moscovitch | 361/683 |
| 2004/0041062 A1 * | 3/2004 | Ozolins et al. | 248/122.1 |
| 2004/0084585 A1 * | 5/2004 | Watanabe et al. | 248/276.1 |
| 2005/0041379 A1 * | 2/2005 | Jang | 361/681 |
| 2006/0038092 A1 * | 2/2006 | Choi | 248/121 |
| 2006/0175476 A1 * | 8/2006 | Hasegawa et al. | 248/125.1 |
| 2007/0217134 A1 * | 9/2007 | Shin | 361/681 |

* cited by examiner

*Primary Examiner*—Amy J. Sterling
(74) *Attorney, Agent, or Firm*—Hamilton & Terrile, LLP; Robert W. Holland

(57) ABSTRACT

Information handling system flat panel displays, such as liquid crystal and plasma displays, are supported on an adjustable stand having a rotation limiter that restricts adjustments of display positions to prevent damage to the display. A display bracket allows rotation of a display between landscape and portrait orientations and a support member allows adjustment of the vertical height of the display bracket relative to a base. The rotation limiter is disposed between the display bracket and support member to restrict rotation of the display bracket from the landscape to the portrait orientation when the support member adjusts the display bracket below a predetermined height at which the display extends beyond the support member. The rotation limiter allows rotation of the display bracket above the predetermined height but restricts height adjustment below the predetermined height unless the display bracket is in the landscape orientation.

13 Claims, 3 Drawing Sheets

SYSTEM AND METHOD FOR DISPLAY STAND HEIGHT ADJUSTMENT

BACKGROUND OF THE INVENTION

1. Field of the Invention

The present invention relates in general to the field of information handling system display stands, and more particularly to a system and method for display stand height adjustment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to communicate, display print or otherwise process information. For instance, information handling systems typically display information with external displays interfaced through a cable. Initially, information handling systems generally displayed information with cathode ray tube (CRT) displays. However, CRT displays tend to be bulky, heavy and awkward, making them inconvenient for use on a desktop and impractical in a portable configuration. Information handling system manufacturers have thus developed flat panel displays as an alternative to CRT displays. For instance, flat panel displays use liquid crystal (LCD) or plasma technology to generate images so that a typical flat panel display has a thickness measured in just inches with substantially less bulk and weight than a CRT display having a similarly-sized display screen. Information handling system users generally prefer flat panel displays compared with CRT displays because of the more convenient size and shape of flat panel displays as well as greater flexibility in the display of information. For example, flat panel displays are often also configured and sized to present high definition television information, such as with a 4:3 or 16:9 widescreen display ratios. Widescreen displays give information handling system users greater flexibility in the presentation of information from an information handling system, such with the selection of landscape or portrait display orientations.

Due to their relatively thin construction, flat panel displays are typically supported by an independent stand. Often, flat panel display stands are adjustable so that a user can adjust the position of the display relative to the stand. For instance, flat panel display stands often allow height adjustment of the display relative to the base of the stand. In some instances, flat panel display stands allow rotation of the display between landscape and portrait orientations. As an example, users sometimes prefer to orient widescreen displays in a portrait orientation that presents a display area shaped similar to the dimensions of a piece of paper. In the portrait orientation, a greater portion of the display area becomes usable for displays that present information in page formats. However, since a widescreen display has a greater height in a portrait orientation than in a landscape orientation, the display stand generally must adjust vertically to comfortably accommodate each orientation. One difficulty with such vertical adjustment is that the display may inadvertently extend beyond the base of the stand during vertical or rotational movement to come into contact with the surface on which the base of the stand rests, such as a desktop. In such instances, damage may occur to both the display and to the resting surface.

SUMMARY OF THE INVENTION

Therefore a need has arisen for a system and method which supports a flat panel display on a surface for rotation between landscape and portrait orientations without impacting the flat panel display into the surface.

In accordance with the present invention, a system and method are provided which substantially reduce the disadvantages and problems associated with previous methods and systems for selecting the orientation of an information handling system display. Vertical and rotational adjustments to the position of a display mounted on a stand are selectively allowed or restricted in order to prevent the display from extending beyond the base of the stand and into a support surface. For instance, rotation from a landscape to a portrait orientation is restricted unless the display is adjusted to at least a predetermined height. As another example, downward vertical adjustment below the predetermined height is restricted if the display is in a portrait orientation.

More specifically, a display is supported over a support surface with a display stand. A base rests on the support surface with a vertically adjustable support member extending upwards to a display bracket. A tilt hinge couple to the display bracket and support member allows adjustments to the orientation of the display bracket, such as rotation between landscape and portrait orientations. A rotation limiter disposed in the tilt hinge and support member restricts rotation to the portrait orientation unless the support member extends at least a predetermined height above the base and restricts height adjustments below the predetermined height unless the display bracket is aligned in a landscape orientation. The rotation limiter is a lever disposed in the tilt hinge, a vertical lock disposed in the support member and a piston interfaced between the lever and the vertical lock. The lever has a shallow opening that accepts a pin protrusion from the display bracket when aligned in a landscape orientation and a deep opening that engages the pin when aligned in a portrait orientation. Insertion of the pin in the lever prevents rotation of the display bracket, however, allows height adjustment of the support member since a reduced lever movement translated through the piston to the vertical lock allows support member adjustments. Engagement of the pin in the deep opening, such as occurs in the portrait orientation, induces greater movement of the lever that is translated through the piston to engage the vertical lock, preventing downward adjustment of support member height.

The present invention provides a number of important technical advantages. One example of an important technical advantage is that adjustments to the orientation of a display are automatically restricted by a display stand to prevent impact of the display into a support surface. Restriction of adjustments from landscape to portrait orientations are enforced unless the stand is adjusted to a height that is sufficient to prevent the display from impacting the support surface during the rotation. Restriction of adjustments of height are enforced with the display in a portrait orientation to prevent downward height adjustment of the display into the support surface. Thus, damage to the display by inadvertent impact with the support surface is automatically avoided.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system flat panel display stand restricts adjustments of the flat panel display to avoid impact with a supporting surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
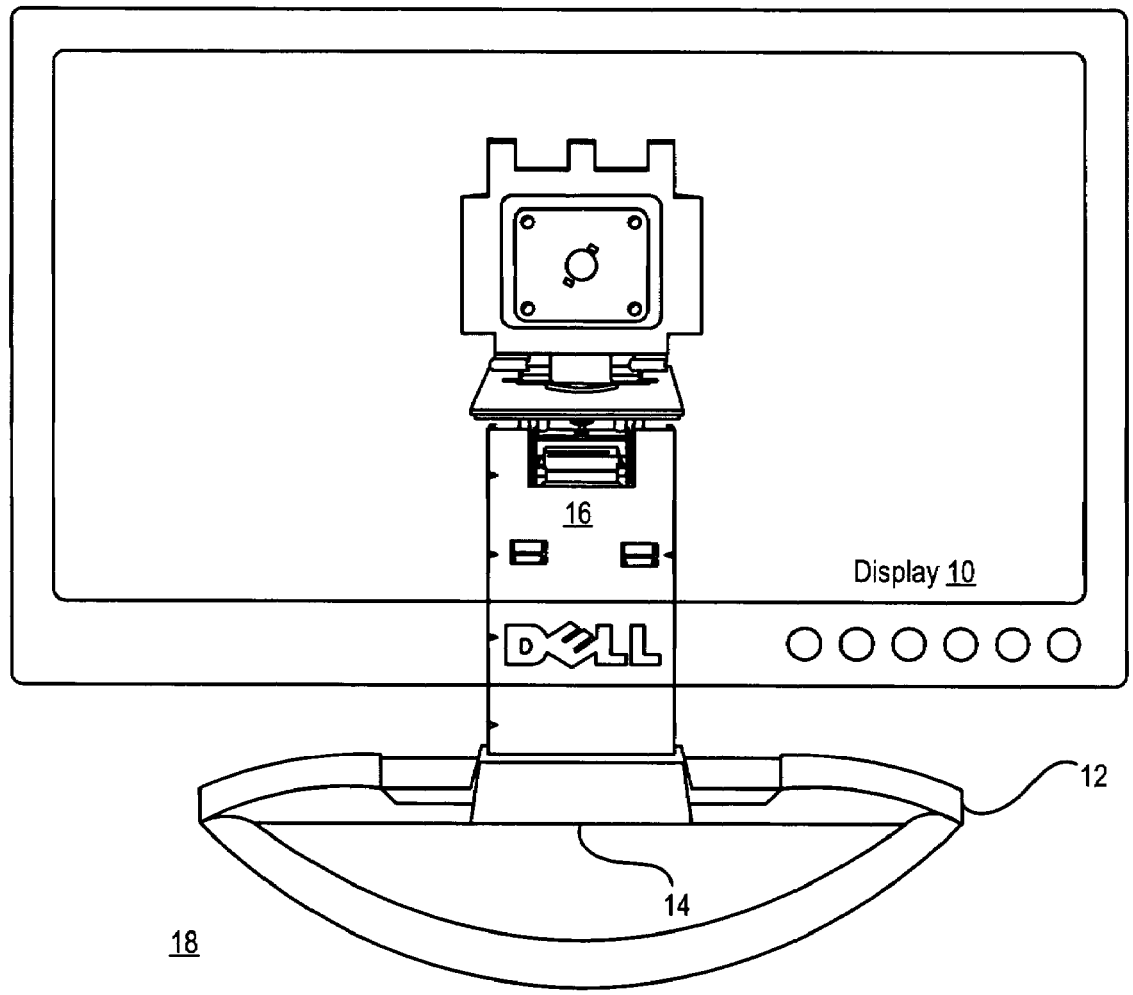
FIG. 1 depicts a flat panel display supported on a stand in a landscape orientation.

Referring now to FIG. 1, a flat panel display 10 is mounted on a support stand 12 in a landscape orientation. Flat panel support stand 12 has a base 14 and an adjustable support member 16. Base 14 rests on a surface 18, such as a desktop, with adjustable support member 16 raising or lowering flat panel display 10 relative to base 14 in order to adjust the height of flat panel display 10 relative to the support surface 18. Flat panel display 10 is, for instance, a liquid crystal display (LCD) or plasma display that has a rectangular shape. In the landscape orientation, the greater length of the rectangle runs substantially parallel with support surface 18. Flat panel display stand 12 rotationally couples to flat panel display 10 to allow rotation between the landscape orientation depicted by FIG. 1 and a portrait orientation depicted by FIG. 2. In the portrait orientation, the greater length of the rectangle shape of display 10 is substantially perpendicular to support surface 18.

Figure 2:
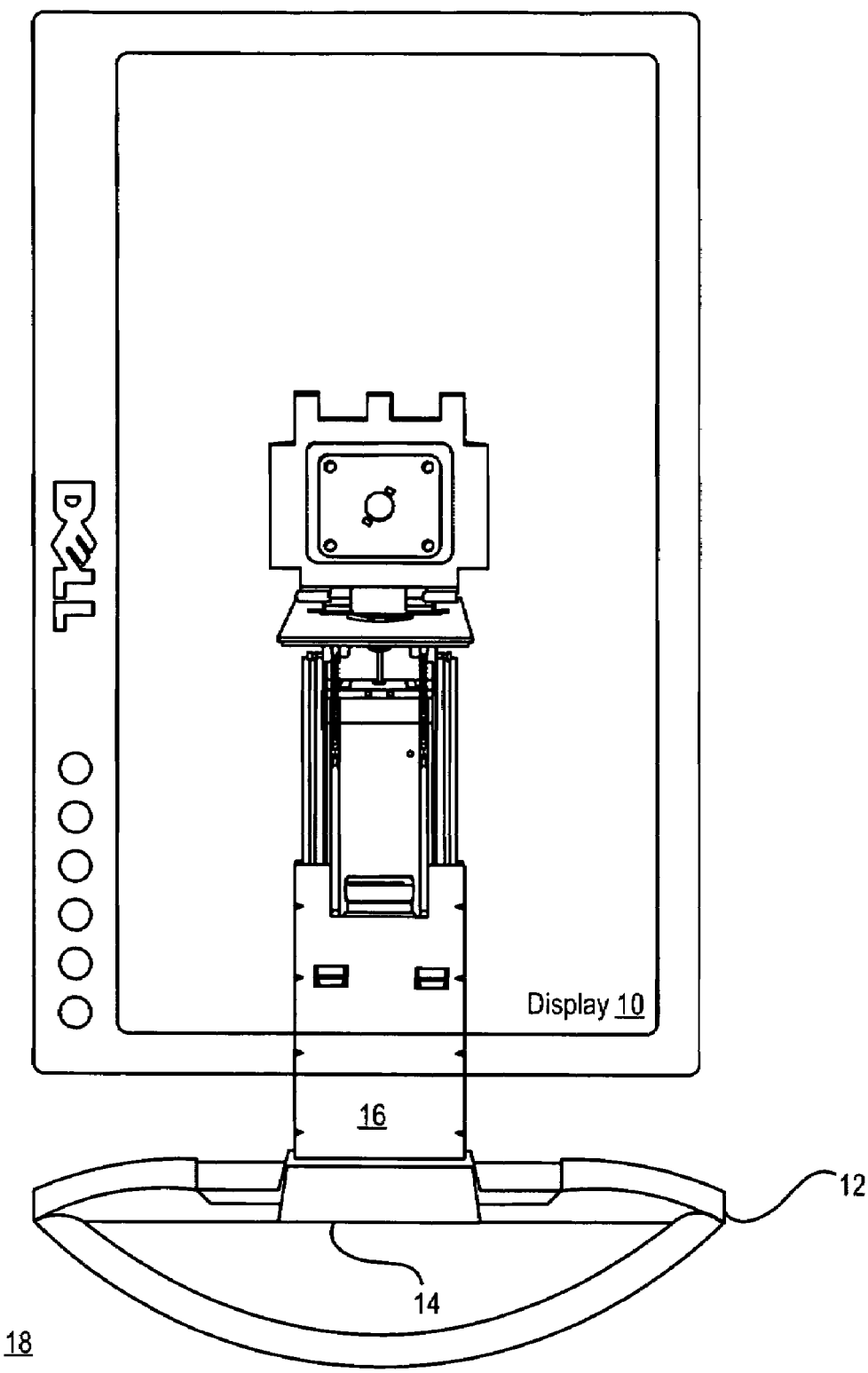
FIG. 2 depicts a flat panel display supported on a stand in a portrait orientation.

In order to accommodate rotation of flat panel display 10 from the landscape orientation depicted by FIG. 1 to the portrait orientation depicted by FIG. 2, support member 16 adjusts the vertical height of flat panel display 10 to avoid contact with support surface 18. Support stand 12 incorporates a rotation limiter that automatically restricts height and rotational adjustments of flat panel display 10 to avoid impact with support surface 18. For instance, height and rotation adjustments are restricted so that the dimensions of flat panel display will not extend beyond the current adjusted length of support member 16 and into base 14. One example of an adjustment restriction is that the rotation of flat panel display 10 from the landscape to the portrait orientation is restricted unless support member 16 extends to at least a predetermined height, such as a height sufficient to avoid contact of flat panel display 10 with support surface 18 during and after the rotation. Another example of an adjustment restrict is that height adjustment of flat panel display 10 with support member 16 is restricted to a least a predetermined height if flat panel display is in the portrait orientation so that flat panel display 10 is not lowered into support surface 18. The rotation limiter automatically intercedes to prevent inadvertent user attempts to adjust the position of flat panel display 10 on stand 12 in a manner that risks impact of flat panel display 10 against base 14 or support surface 18.

Figure 3:
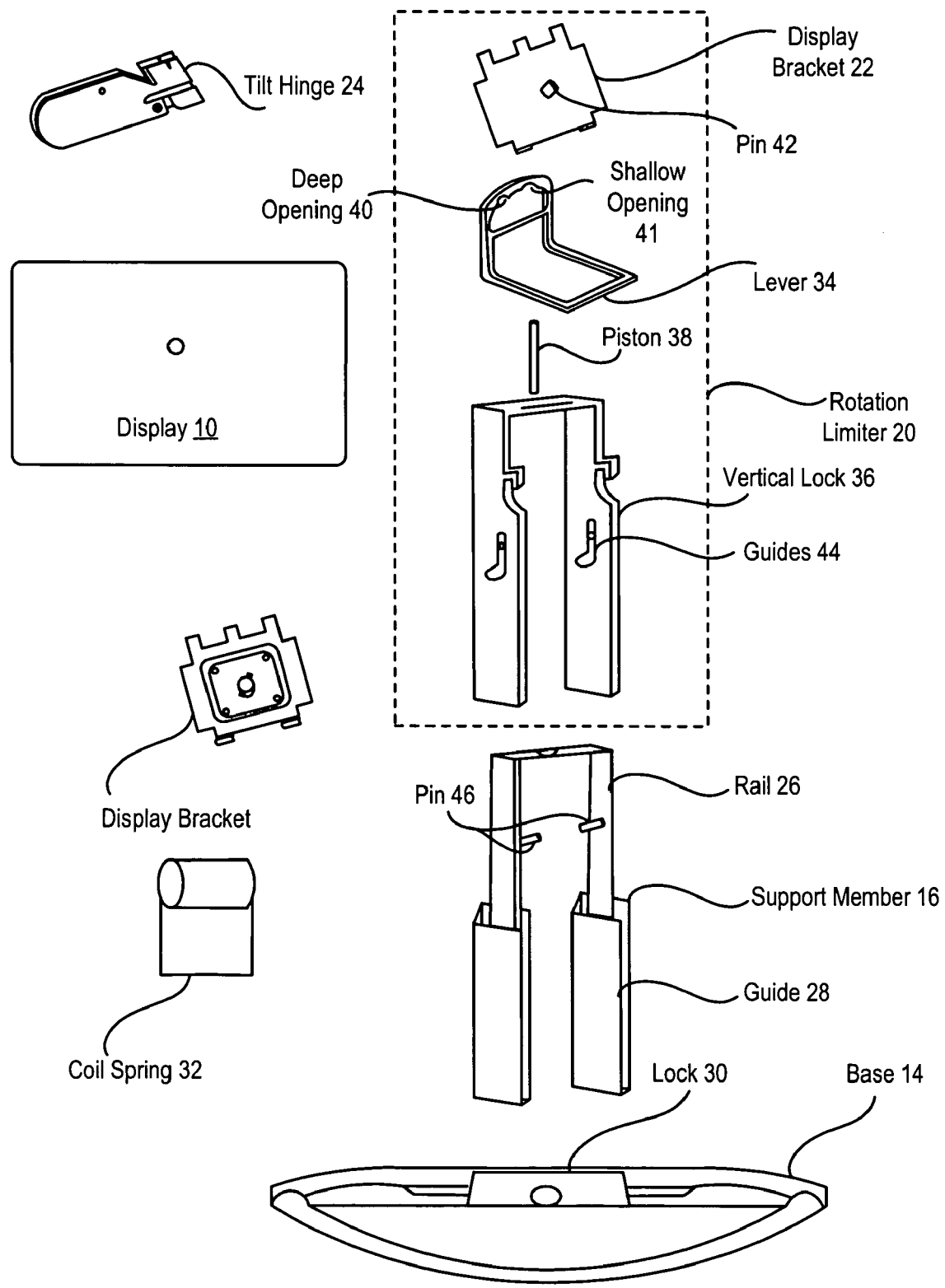
FIG. 3 depicts a blow-up view of a flat panel support stand having a rotation limiter to selectively restrict and allow flat panel display adjustments in predetermined positions.

Referring now to FIG. 3, a blow-up view depicts a flat panel support stand having a rotation limiter 20 to selectively restrict and allow flat panel display adjustments in predetermined positions. Flat panel display 10 couples to a display bracket 22, which is flexibly held in position with a tilt hinge 24 that allows rotation and angular adjustments to display bracket 22 about the vertical, horizontal and lateral axes. For instance, tilt hinge 24 provides for rotation of display bracket 22 to orient flat panel display 10 in landscape and portrait orientations. Tilt hinge 24 couples to the upper end of support member 16, which adjusts vertically to raise and lower display bracket 22 by sliding rails 26 within guides 28. A lock 30 locks rails 26 at a bottom position of guides 28 to maintain display bracket 22 in a low vertical adjustment. A coil spring 32 bias rails 26 to a top position of guides 28 to maintain display bracket 22 in an upper vertical adjustment. Rotation limiter 20 is disposed within tilt hinge 24 and support member 16 to selectively allow and restrict movement of display bracket 22 based on its position relative to base 14.

Rotation limiter 20 as depicted in the example of FIG. 3 has a lever 34 disposed within tilt hinge 24, a vertical lock 36 disposed within support member 16 and a piston 38 that translates motion of lever 34 to the top portion of vertical lock 36. Lever 34 has a deep opening 40 and a shallow opening 41 sized to fit a pin protrusion 42 extending from bracket 22. Pin 42 is biased by tilt hinge 24 away from lever 34 at a predetermined height and pushed against lever 34 when tilt hinge 24 is press downward against piston 38. The amount of motion imparted against lever 34 by contact with pin 42 depends on whether pin 42 inserts into deep opening 40 or shallow opening 41. When display bracket 22 has display 10 aligned in the landscape orientation, pin 42 enters shallow opening 41 and in the portrait orientation deep opening 40, with the entry of the pin into the respective opening restricting rotation of display bracket 22. Vertical lock 36 provides a biasing force through piston 38 against lever 34 when support member 16 is in the low vertical adjustment so that pin 42 is maintained in opening 40 or 41. If support member 16 is raised to a top adjustment position, the bias imparted by piston 38 is released so that tilt hinge 24 biases pin 42 from opening 40 or 41, allowing bracket 22 to rotate in the upper position. Thus, rotation of display 10 is prevented unless support member 16 is raised to an upper position in which pin 42 is removed from the opening 40 or 41 of lever 34.

Rotation limiter 20 not only prevents rotation of display 10 in a lower vertical adjustment, but also prevents movement of support member 16 from the upper to the lower vertical adjustment unless display 10 is in a landscape orientation. If display bracket 22 is rotated to a portrait orientation, pin 42 is aligned with opening 40 to move lever 34 a greater distance when tilt hinge 34 is pressed down than if pin 42 aligns in opening 41. The greater amount of movement of lever 34 is translated to a greater movement of piston 38 against vertical lock 36. The increased movement of piston 38 is, in turn, translated to an increased amount of movement of vertical lock 36 relative to support member rails 26 before tilt hinge 24 moves rail 26. Vertical lock 36 has guide openings 44 engaged with pins 46 extending from rail 26. Guide openings 44 are offset from vertical so that movement of pins 46 in guides 44 causes lateral movement of vertical lock 36 relative to support member 16. The lateral movement of vertical lock 36 presses vertical lock 36 against support member guides 28 to arrest downward motion of support member rails 26. If pin 42 is aligned with opening 41 of lever 34, such as when bracket 22 is in the landscape orientation, the amount of motion of vertical lock 36 relative to pins 46 is decreased so that lateral motion of vertical lock 36 induced by guides 44 does not arrest downward motion of bracket 22. In order to lower support member 16, bracket 22 is rotated to align pin 42 with opening 41, thus reducing the movement of vertical lock 36 relative to pins 46 and avoiding the lateral movement of vertical lock 36 induced by full movement of pins 46 in guides 44. Once lowered, bracket 22 is prevented from rotation to the portrait orientation by the engagement of pin 42 in opening 41 until support member 16 is raised to the upper position.

Although the present invention has been described in detail, it should be understood that various changes, substitutions and alterations can be made hereto without departing from the spirit and scope of the invention as defined by the appended claims.

What is claimed is:

1. An information handling system display stand comprising:
   a base operable to rest on a surface;
   a display bracket operable to couple to a display and rotate the display between landscape and portrait orientations;
   a support member extending upwards from the base to the display bracket and operable to support the display bracket over the base at adjustable heights; and
   a rotation limiter interfaced with the display bracket and operable to restrict rotation between the landscape and portrait orientations unless the support member extends the display bracket at least a predetermined height over the base;
   the rotation limiter further comprising:
   a protrusion extending from the display bracket;
   a lever aligned to engage the protrusion in a first position when the display bracket is aligned in the portrait orientation; and
   a vertical lock interfaced with the lever and the support member, the vertical lock restricting adjustment of the support member height with the protrusion engaged in the first position.

2. The information handling system display stand of claim 1 wherein the rotation limiter is further operable to restrict height adjustment to at or above a predetermined height over the base if the display is in the portrait orientation.

3. The information handling system display stand of claim 1 further comprising a flat panel display coupled to the display bracket and operable to present information in a landscape orientation or a portrait orientation.

4. The information handling system display stand of claim 3 wherein the flat panel display is a liquid crystal display.

5. The information handling system display stand of claim 1 wherein the lever further has an opening aligned to engage the protrusion in a second position when the display bracket is aligned in the landscape orientation, the vertical lock allowing adjustment of the support member height with the protrusion engaged in the second position.

6. The information handling system display stand of claim 5 wherein the engagement of the protrusion in the opening restricts rotation of the display bracket below the predetermined height over the base.

7. A method for supporting a display in landscape and portrait orientations, the method comprising:
   allowing vertical adjustment of the display with the landscape orientation; and
   restricting vertical adjustment of the display below a predetermined height with the portrait orientation, wherein restricting vertical adjustment further comprises:
   engaging a protrusion of a display bracket against a lever;
   engaging the lever against a vertical lock; and
   blocking downward movement of a support member with the vertical lock.

8. The method of claim 7 further comprising:
   restricting rotation between the landscape and portrait orientations below the predetermined height.

9. The method of claim 8 wherein the display comprises a flat panel display.

10. The method of claim 9 wherein the flat panel display is a liquid crystal display.

11. The method of claim 9 wherein the flat panel display is a plasma display.

12. The method of claim 7 wherein allowing vertical adjustment further comprises:
   engaging the protrusion in an opening of the lever to avoid engaging of the vertical lock.

13. The method of claim 12 wherein restricting rotation further comprises:
   restricting rotation by engaging the protrusion in the opening of the lever.

* * * * *